United States Patent [19]
Borchardt

[11] Patent Number: 4,799,547
[45] Date of Patent: Jan. 24, 1989

[54] A $CO_2$ DRIVE PROCESS FOR OIL RECOVERY EMPLOYING AN ALCOHOL ETHOXYCARBOXYLATE SURFACTANT

[75] Inventor: John K. Borchardt, Houston, Tex.

[73] Assignee: Shell Oil Company, Houston, Tex.

[21] Appl. No.: 150,471

[22] Filed: Jan. 29, 1988

Related U.S. Application Data

[63] Continuation of Ser. No. 909,754, Sep. 19, 1986, abandoned.

[51] Int. Cl.[4] .................... E21B 43/22
[52] U.S. Cl. .................... 166/275; 166/273; 166/309; 252/8.554
[58] Field of Search .................... 166/269, 273, 274, 275, 166/309; 252/8.554

[56] References Cited

U.S. PATENT DOCUMENTS

| | | | |
|---|---|---|---|
| 2,233,382 | 2/1941 | DeGroote | 252/8.554 |
| 3,084,743 | 4/1963 | West et al. | 166/273 |
| 3,342,256 | 9/1967 | Bernard et al. | 166/273 |
| 4,380,266 | 4/1983 | Wellington | 166/273 X |
| 4,485,873 | 12/1984 | Balzer et al. | 166/274 |
| 4,495,995 | 1/1985 | Chen et al. | 166/309 X |
| 4,542,790 | 9/1985 | Balzer | 252/8.554 X |

OTHER PUBLICATIONS

SPE Paper No. 14393, Wellington et al., Presented at the 60th Annual Technical Conference and Exhibition of the SPE, Las Vegas, NV, Sep. 22–25, 1985.

SPE Paper No. 14394, Borchardt et al., Presented at the 60th Annual Technical Conference and Exhibition of the SPE, Las Vegas, NV, Sep. 22–25, 1985.

*Van Nostrand Reinhold Encyclopedia of Chemistry,* Fourth Edition, 1984.

D. Balzer, "Carboxymethylated Ethoxylates as EOR Surfactants" (2nd European Symposium Enhanced Oil Recovery, Paris, Nov. 8–10, 1982).

*Primary Examiner*—George A. Suchfield
*Attorney, Agent, or Firm*—Richard F. Lemuth

[57] ABSTRACT

A process for enhancing the recovery of oil from a subterranean oil-containing reservoir having a temperature of at least about 40° C., which comprises steps for (a) injecting into an injection well in the reservoir substantially liquid $CO_2$ and an aqueous mixture containing between about 50 and 10,000 parts per million by weight, calculated on the weight of the water, of one or more surfactants of the formula $$R-(OCH_2CH_2)_x-Z$$

wherein R represents an alkyl group of about 8 to 16 carbon atoms, x is an integer having an average value of about 5 to 20, and Z represents either a —OCOOM formate group or a $-OCH_2COOM$ acetate group, with M representing a mono-valent inorganic cation, to displace oil from the reservoir, and (b) recovering the displaced oil from one or more recovery wells in the reservoir.

The alcohol ethoxycarboxylate surfactants utilized in this process provide excellent control over the mobility of the $CO_2$ in the reservoir, and its performance is relatively insensitive to the presence of any of a wide variety of different crude oils.

19 Claims, No Drawings

A $CO_2$ DRIVE PROCESS FOR OIL RECOVERY EMPLOYING AN ALCOHOL ETHOXYCARBOXYLATE SURFACTANT

This is a continuation of application Ser. No. 909,754, filed Sept. 19, 1986, now abandoned.

BACKGROUND OF THE INVENTION

The present invention relates to a process for the enhanced recovery of oil from an underground oil-containing formation, more particularly to a process for displacing oil by injecting into and driving through such a formation a mixture containing carbon dioxide ($CO_2$), a surfactant and water, and most particularly to an improved $CO_2$ drive process which utilizes an alcohol ethoxycarboxylate surfactant.

It is known in the art that oil can be displaced within and recovered from a subterranean reservoir by injecting a drive fluid containing pressurized (substantially liquid) $CO_2$, water and a surfactant. Examples of such drive processes are to be found in the disclosures of U.S. Pat. No. 3,342,256, entitled Method for Recovering Oil from Subterranean Formations, which issued to G. G. Bernard et al on Sept. 19, 1967, U.S. Pat. No. 4,380,266, entitled Reservoir-tailored $CO_2$-aided Oil Recovery Process, which issued to S. L. Wellington on Apr. 19, 1983 and of U.S. Pat. No. 4,502,538, entitled Polyalkoxy Sulfonate, $CO_2$ and Brine Drive Process for Oil Recovery, which issued to Wellington et al on Mar. 5, 1985.

Of particular interest to the present invention is the surfactant utilized in such a $CO_2$ drive process. Use is made of the surfactant to form a "foam" which reduces the mobility of the $CO_2$ in the reservoir. It is well recognized in the art that many reservoir flood or drive processes, including those utilizing $CO_2$, suffer from a tendency of the injected fluids to sweep oil from only a limited volume of the reservoir. The fluids breakthrough to the recovery well before they have the opportunity to efficiently invade and displace oil from the reservoir rock. The above-cited patents, as well as in the other art described therein, recite the benefits of several different surfactant compounds for mobility control in $CO_2$ drive processes. Specific mention is made of polyalkoxylated alcohols and phenols, polyalkoxylated alcohol sulfates, alkyl sulfoacetates, block polymers of polyoxyethylene and polyoxypropylene, petroleum sulfonates, aliphatic alcohols, naphthenyl alcohol, amorphous glycosides, and polyalkoxylated alcohol and phenol sulfonates, and polyalkoxylated alcohol and phenol glyceryl sulfonates. At least one alcohol ethoxysulfate surfactant has been used in $CO_2$ drive processes in the oilfield (L. Holm, J. Petroleum Technol., 22, 1409–1506 (1970); L. Holm "$CO_2$ Diversion Using Foam in an Immiscible $CO_2$ Field Project," Paper No. SPE/DOE 14963 presented at the SPE/DOE Fifth Joint Symposium on Enhanced Oil Recovery, Tulsa, OK, Apr. 20–23, 1986; and J. R Heller et al, SPE Paper No. 14395, presented at the Sixtieth Annual Conference and Exhibition of the Society of Petroleum Engineers of AIME, Las Vegas, Nev., Sept. 22–25, 1985).

SUMMARY OF THE INVENTION

It has now been found that certain alcohol ethoxycarboxylate surfactants offer excellent performance as the surfactant component in $CO_2$ drive processes for oil recovery. These surfactants are found to provide a high degree of control over the mobility of the $CO_2$ drive medium in the oil-containing reservoir.

In brief summary, the present invention can be described as a process for enhancing the recovery of oil from a subterranean oil-containing reservoir having a temperature of at least about 40° C., which comprises steps for (a) injecting into an injection well in the reservoir substantially liquid $CO_2$ and an aqueous surfactant mixture containing between about 50 and 10,000 parts per million by weight, calculated on the weight of the water, of one or more alcohol ethoxycarboxylate surfactants of the formula

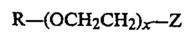

$$R-(OCH_2CH_2)_x-Z$$

wherein R represents an alkyl group of about 8 to 16 carbon atoms, x is an integer having an average value of about 5 to 20, and Z represents either a $-OCOOM$ formate group or a $-OCH_2COOM$ acetate group, with M representing a mono-valent inorganic cation, to displace oil from the reservoir, and (b) recovering the displaced oil from one or more recovery wells in the reservoir.

Among the most important performance characteristics of the ethoxycarboxylates in the $CO_2$ drive process of the invention is their ability to maintain excellent foam generation and stability properties, and thus mobility control, in the presence of a wide variety of crude oils. Furthermore, the surfactant has been found to be substantially less sensitive to compositional variations and charges in the crude oil deposit which they would typically contact in $CO_2$ drive applications. In conventional practice, it has generally been necessary to tailor the choice of surfactant to a given reservoir service.

With respect to one particularly significant compositional aspect or the various crude oils and reservoir brines, that aspect relating to acid and base characteristics, the desired properties of the surfactants specified for use in the invention have been found to be particularly insensitive to differences between various crudes, and also to the relatively high acidity of aqueous media in contact with pressurized $CO_2$. Furthermore, the properties of the alcohol ethoxycarboxylates have been found to withstand changes in composition of the reservoir oil over the course of the $CO_2$ drive process. Crude oils typically respond to contined contact with $CO_2$ through increases in their acid numbers and base numbers and in asphaltene and paraffin content. (The acid number and base number are indicative of oil polarity.) In many applications of prior art $CO_2$ drive processes, these changes in the oil over the course of the process prevent the necessary tailoring of the surfactant to the particular service. For instance, the tailoring of a surfactant in a prior art process to application for recovery of a given reservoir oil may not be practical in a service in which the character of the residual oil is continually changing.

The excellent performance of the invention, in terms of mobility control within the reservoir if considered particularly surprising in view of early indications, published in the art (J. K. Borchardt et al, "Surfactants for $CO_2$ Foam Flooding," SPE Paper No. 14394, presented at the Sixtieth Annual Technical Conference and Exhibition of the Society of Petroleum Engineers, Las Vegas, Nev., Sept. 22–25, 1985), that alcohol ethoxycarboxylate surfactants did not possess the $CO_2$ foam generation and stability properties typically characteristic of surfactants exhibiting good mobility control in $CO_2$ drive service. Laboratory investigations of foam generation and stability of the alcohol ethoxycarboxylates in tests expected to be predictive of the utility of the surfactants in the $CO_2$ drive process suggested that these surfactants were wholly unsuited to $CO_2$ drive service, particularly at elevated temperatures representative of those encountered in actual reservoir applications.

DESCRIPTION OF THE PREFERRED EMBODIMENTS

The present invention centers upon the use of the particular alcohol ethoxycarboxylate surfactants in an improved $CO_2$ foam oil drive process, and upon specified conditions of the drive process which are necessary to the desired performance of the improved process.

The alcohol ethoxycarboxylate surfactants suitable for service in the invention are compounds of the formula

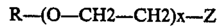

R—(O—CH2—CH2)x—Z wherein R represents an alkyl group of about 8 to 16 carbon atoms, x represents the number of ethylene oxide (ethoxy) units in the molecule and has an average value of about 4 to 20, and Z represents a carboxylate group. Particularly preferred surfactants for use in the invention have a carboxylate group which is either a formate group of the formula —COOM or an acetate group of the formula —$CH_2COOM$. The surfactants are used in the salt form, with M representing a monovalent inorganic cation, for example, an alkali metal or ammonium cation.

It is critical to the purposes of this invention that the R moiety in compounds represented by formula I be an alkyl group, rather than an aromatic group or an alkyl-substituted aromatic group. Corresponding surfactants having a hydrophobic moiety R which is aromatic in character are well known in the art, and are generally to be expected to offer properties and performance which are very similar to surfactants in which R is alkyl. However, it has been found that compounds having aromatic R groups do not provide the desired mobility control in a process such as that of the invention.

Preference can be expressed for the use in the invention of ethoxycarboxylate surfactant compounds wherein the R moiety has between about 9 and 15 carbon atoms, while compounds in which R is a $C_{11}$ to $C_{15}$ alkyl group are considered more preferred. Also preferred are surfactants in which the R moiety is linear (straight chain) in a major portion of the molecules, although compounds having branched alkyl chains are also suitable.

Alcohol ethoxycarboxylate surfactants of formula (I) are known in the art to be prepared by a process which comprises an ethoxylation reaction between an alcohol reactant comprising one or more alcohols of the formula ROH and an ethylene oxide reactant, in relative quantities of x moles of ethylene oxide for each mole of alcohol, followed by reaction of the resulting alcohol ethoxylate mixture with, for example, a salt of a corresponding chlorocarboxylic acid. The ethoxylation reaction is suitably accomplished by contacting the $C_8$ to $C_{16}$ alcohol with gaseous ethylene oxide at a temperature of about 100°-200° C. in the presence of a catalyst which may be either acidic or basic. An alkali metal hydroxide, in a quantity of about 0.2 to 2 percent by weight (% w), calculated on alcohol, is a very suitable ethoxylation catalyst. The resulting alcohol ethoxylate product is a mixture of compounds of the formula R—(O—$CH_2$—$CH_2$)$_y$—OH, having a range of values for y which are conveniently represented by an average value x. The ethoxylate product is then converted to the desired alcohol ethoxyformate or ethoxyacetate by known methods, for instance, by reaction with a corresponding salt of chloroformic or chloroacetic acid in the presence of an alkali or alkaline earth metal hydroxide. For purposes of the invention, x in the surfactant formula preferably represents an average of 6 to 15 ethylene oxide units, more preferably an average of 9 to 13 ethylene oxide units.

Conversion of alcohol ethoxylates to alcohol ethoxycarboxylates is also known to be accomplished to oxidation of the ethoxylates.

The ethoxycarboxylates are commercially available for, or can be manufactured at, relatively low cost in comparison to surfactants which are known in the art for utility in surfactant-assisted $CO_2$ drive processes and which provide comparable $CO_2$ mobility control.

Apart from the use of the specified surfactant under the indicated critical temperature conditions, the process of this invention is suitably carried out using general procedures known in the art for $CO_2$ foam drive oil recovery. Examples of such procedures are disclosed in the aforementioned patents of Bernard et al, Wellington and Wellington et al, and the prior art cited therein, specifically including U.S. Pat. No. 3,342,256, U.S. Pat. No. 3,529,668, U.S. Pat. No. 4,088,190, U.S. Pat. No. 4,113,,011, U.S. Pat. No. 4,380,266 and U.S. Pat. No. 4,502,538. The teachings of of these patents relative to procedures for $CO_2$ foam drive processes are are incorporated herein by this reference thereto.

The surfactant is suitably mixed with the water and the resulting mixture is injected into the oil-bearing formation either prior to, concurrently with, or following an injection of the $CO_2$. In one mode of operation, the $CO_2$ is injected at the same time as and in mixture with the aqueous surfactant mixture. In another mode of operation, which is generally preferred, injections of slugs of the aqueous mixture are made between distinct injections of slugs of $CO_2$. Still other sequences of injection are also known, such as, for example, injection of $CO_2$ followed by injection of water or brine without surfactant, followed by injection of the aqueous surfactant mixture, followed by injection of $CO_2$, etc. Injection of the drive components is made into an injection well, and oil displaced by the drive is recovered at one or more recovery wells in fluid communication with the injection well.

In addition to their excellent performance in mobility control of $CO_2$ drive processes, the specified alcohol ethoxycarboxylate surfactants possess the necessary chemical stability under conditions of temperature, salinity, pH, etc., encountered within the typical oil-containing reservoir to which one skilled in the art would apply a $CO_2$ drive process.

The water utilized for preparing the aqueous mixture injected in the course of the practice of the invention is suitably substantially pure water, but may also very suitably contain dissolved solids, for instance, inorganic salts. Aqueous brines, such as seawater or a brine as is produced with oil from an underground reservoir, are commonly employed. The ethoxyacetate surfactant is very tolerant of the typical brine components, and brines containing substantial amounts of dissolved solids, e.g., those containing up to about 12% w of inorganic salts, are suitable in the invention. The alcohol ethoxyacetate surfactants useful in the invention are very soluble in water, and are soluble in, or form handleable dispersions with, typical brines.

The $CO_2$ utilized in the invention is substantially in the liquid state, which is intended to encompass $CO_2$ at pressures above its critical pressure.

Under preferred practice, the ethoxycarboxylate surfactant is injected for purposes of the invention in a quantity which averages at least about 50 parts per million by weight (ppm), relative to the injected water. In practical applications, the quantity of surfactant generally does not exceed about 10,000 ppm, although greater amounts can be used. More preferably, the surfactant is applied in a proportion of between about 100 and 1000 ppm relative to the injected water, while a quantity of surfactant that is between about 300 and 700 ppm relative to injected water is considered most generally preferred. The quantity of water injected is preferably between about 0.1 and 1 parts by volume relative to the liquid $CO_2$, more preferably between about 0.1 and 0.25 parts by volume relative to liquid $CO_2$. Within the suitable ranges of component proportions, the relative amounts of $CO_2$, water and and surfactant may be varied to provide the desired foam viscosity and mobility control for a particular process application. These relative amounts will determine the viscosity and mobility of the foam, and may be varied to best suit each particular application of the process.

Overall, the total volume of the aqueous surfactant mixture injected into the reservoir typically, but not necessarily, represents between about 1 and 25 percent of the pore volume of the reservoir.

It is critical to the invention that the process be applied to a reservoir having a temperature of at least about 40° C. The desired foam forming tendencies of the alcohol ethoxyacetate-containing $CO_2$ drive have not been found to be consistently realized at lower temperatures. Reservoir temperatures of at least about 50° C. are preferred, while temperatures of at least about 60° C. are more preferred and temperatures of at least about 70° C. are considered most preferred. The ethoxyacetates surfactants are stable, and the process is generally applicable, at temperatures up to about 95° C. A reservoir temperature in the range from about 70° C. to 80° C. is particularly preferred. Process pressure is not critical, and the invention is suitably conducted at pressures which have been found to be suitable for conventional $CO_2$ drive processes. In preferred practice, the $CO_2$ is injected substantially in the liquid state and at a pressure of at least about 1000psig. Higher pressures, e.g., greater than about 1200 psig and particularly greater than about 1500psig are generally more preferred. Most preferably, $CO_2$ is injected at a pressure greater than the miscibility pressure characteristic of the particular reservoir. Miscibility pressure is the minimum pressure at which the $CO_2$ liquid and the oil with which it is in contact are miscible. In practice, miscibility pressure is primarily governed by the nature of the crude oil and the reservoir temperature.

The invention will now be further described with reference to the following examples which are intended to illustrate certain of its preferred embodiments but are not intended to limit its broader scope. Comparative experiments are provided to illustrate the performance of the invention in comparison to processes not in accordance with the invention.

The several different types of surfactants utilized in the examples and comparative experiments are identified by the acronyms AEC for alcohol ethoxycarboxylates;

APEC for alkylphenol ethoxycarboxylates;

AES for alcohol ethoxysulfates;

AESo for alcohol ethoxyethylsulfonates; and

AEGS for alcohol ethoxyglycerylsulfonates.

The AEC surfactants utilized in the examples can in each case be described by formula (I), wherein Z is an acetate group. In addition to its use to describe AEC surfactants, formula (I) may also be applied to represent APEC surfactants, with R representing (for comparative experiments only, not in accordance with the invention) an alkyl(C9)-substituted phenol moiety and Z representing an acetate group. Similarly, formula (I) can be used to describe comparative AES surfactants, in which case Z is a sulfate moiety ($-OSO_3Na$), or AESo surfactants, in which case Z is a sulfonate moiety ($-SO_3Na$), or AEGS surfactants, in which case Z is the glyceryl sulfonate moiety $-CH_2CH(OH)CHSO_3$.

Specific surfactants are identified by the applicable acronym, together with a series of numbers. The number immediately following the acronym refers to number or the range of the number of carbon atoms in the hydrophobic alkyl chain or alkylphenol group of the surfactant molecules. For example, the number 1215 indicates a carbon number range from 12 to 15, inclusive, 810 indicates a carbon number range from 8 to 10, inclusive, and 15 indicates a hydrophobe of 15 carbon atoms. (The alkyl chains of the molecules are predominantly linear, unless otherwise noted.) This number is followed by a hyphen and a second number which identifies the average number of ethylene oxide units in the surfactant molecule, i.e., the value of x in formula (I). A suffix "A" following the ethylene oxide number indicates that the anionic surfactant was in the form of a ammonium salt. In other cases, the anionic surfactants were in the sodium salt form.

Each of the following examples and comparative experiments utilized a one atmosphere foam generation test procedure. According to this procedure, 10cc of a 0.5% w aqueous surfactant solution were placed in a clear tared 25cc graduated cylinder. The hydrocarbon phase was added and the headspace flushed with $CO_2$ to remove air. The tube was sealed, shaken, and allowed to equilibrate at the selected test temperature for 24 hours. Samples were then shaken again and foam volume determined as a function of time. In each case, samples were shaken in a controlled, reproducible manner.

The performance of a surfactant in this one atmosphere foam test procedure has been shown (J. K. Borchardt et al, "Surfactants for $CO_2$ Foam Flooding," Paper No. SPE 14394 and S. L. Wellington et al, "CT Studies of Surfactant-Induced $CO_2$ Mobility Control," Paper No. SPE 14393, both presented at the Sixtieth Annual Technical Conference and Exhibition of the Society of Petroleum Engineers of AIME, Sept. 22–25, 1985) to provide a reliable prediction of the surfactant's foaming behavior in the presence of high pressure $CO_2$, e.g., 2500 psig supercritical $CO_2$, and of the sweep efficiency of the $CO_2$ foam in tertiary, first contact miscible $CO_2$ core floods.

Comparative Experiment A

In initial laboratory one atmosphere foam tests of alcohol ethoxyacetate surfactants, the surfactants were found to have relatively poor foaming properties in the presence of refined hydrocarbons, such as decane and toluene, which are commonly used to model crude oils in controlled laboratory studies. (These initial tests are published in the cited SPE Paper No. 14394 of Borchardt et al.)

Tests were made of AEC and of other surfactants, using as the aqueous test medium one of several brines having the compositions shown in Table 1.

TABLE 1

| Salt | Brine Compositions | | | |
|---|---|---|---|---|
| | Brine 1 | Brine 2 | Brine 3 | Brine 4 |
| NaCl | 10.91% w | 5.19 | 10.38 | 3.81 |
| $NaHCO_3$ | | | | 0.19 |
| $Na_2SO_4$ | | | | 0.29 |
| $CaCl_2$ | 0.46 | 0.76 | 0.76 | 0.66 |
| $MgCl_2$ | 0.51 | | | 0.21 |
| $BaCl_2$ | 0.01 | | | |
| $SrCl_2$ | 0.01 | | | |
| Total Dissolved Solids | 11.70 | 5.95 | 11.14 | 5.16 |
| pH | 3 | 3 | 3 | 3 |

The results of one atmosphere foam tests employing AEC, AES, AESo, and AEGS surfactants and refined hydrocarbons—either decane or a decane/toluene blends—are shown in Table 2. The table compares the foam volume readings (after 60 minutes) for aqueous surfactant in the presence of refined hydrocarbon with the foam volume reading (after 60 minutes) for aqueous surfactant in the absence of hydrocarbon. The ratio of these readings is a measure of the sensitivity of the foaming properties of the surfactant to the presence of the hydrocarbon phase.

At room temperature (25° C.) the sensitivity of the properties of the AEC surfactants to the presence of decane was comparable to that of the AES, AESo and AEGS surfactants. However, at the higher temperature of 75° C., which is representative of a typical petroleum reservoir to which a $CO_2$ drive process would be applied, the AEC surfactant was found to be substantially more sensitive to the presence of decane. At most, only minimal quantities of foam were generated in the elevated temperature tests of each of the AEC surfactants in the presence of decane.

Similarly, in 75° C. tests involving a mixed decane/toluene hydrocarbon, foam volume and foam stability for AEC surfactants were very adversely affected by the presence of hydrocarbons. No foam remained in the 75° C. tests of each of several AEC surfactants in this hydrocarbon system.

In each case, the foaming properties of the alcohol ethoxycarboxylates were particularly poor at the more meaningful higher temperature, relative to that of other surfactants. These results suggested that AEC surfactants would not be suitable for practical application in $CO_2$ drive processes.

TABLE 2

| Surfactant | Temperature (°C.) | Hydrocarbon | Foam Volume Ratio[a] | |
|---|---|---|---|---|
| | | | Brine 2 | Brine 3 |
| AEC 1213-4.5 | 25 | D[b] | 0.04 | 0.04 |
| AEC 1213-6 | " | " | 0.36 | 0.11 |
| AEC 1215-9 | " | " | 0.73 | 0.56 |
| AEC 1214-10 | " | " | 0.72 | 0.64 |
| AEC 1214-13 | " | " | 0.89 | 0.56 |
| APEC 15-5 | " | " | 0 | 0 |
| APEC 15-7 | " | " | 0 | 0 |
| AES 1213-6.5A | " | " | 0.65 | 0.54 |
| AES 1213-12A | " | " | 1.97 | 0.60 |
| AES 1215-6 | " | " | 0.55 | 0.56 |
| AES 810-2.6A | " | " | 0.12 | 0.62 |
| AESo 1215-6 | " | " | 0.55 | 0.49 |
| AESo 1215-12 | " | " | 0.55 | 0.63 |
| AEGS 1215-7 | " | " | 0.64 | 0.51 |
| AEGS 1215-12 | " | " | 1.59 | 0.79 |
| AEC 1213-4.5 | 25 | D/T[c] | 0 | 0 |
| AEC 1213-6 | " | " | 0.02 | 0 |
| AEC 1215-9 | " | " | 0.05 | 0.07 |
| AEC 1214-10 | " | " | 0.02 | 0.025 |
| AEC 1214-13 | " | " | 0.16 | 0.19 |
| APEC 15-5 | " | " | 0 | 0 |
| APEC 15-7 | " | " | 0 | 0 |
| AES 1213-6.5A | " | " | 0.30 | 0.02 |
| AES 1213-12A | " | " | 1.38 | 0.03 |
| AES 1215-6 | " | " | 0.05 | 0 |
| AES 810-2.6A | " | " | 0.12 | 0.09 |
| AESo 1215-6 | " | " | 0.26 | 0.05 |
| AESo 1215-12 | " | " | 0.29 | 0.23 |
| AEGS 1215-7 | " | " | 0.42 | 0.37 |
| AEGS 1215-12 | " | " | 1.29 | 0.47 |
| AEC 1213-4.5 | 75 | D[b] | 0 | 0.10 |
| AEC 1213-6 | " | " | 0 | 0 |
| AEC 1215-9 | " | " | 0 | 0 |
| AEC 1214-10 | " | " | 0.6 | 0 |
| AEC 1214-13 | " | " | 1.67 | 0 |
| APEC 15-5 | " | " | 0 | 0 |
| APEC 15-7 | " | " | 0 | 0 |
| AES 1213-6.5A | " | " | 0.44 | 0.39 |
| AES 1213-12A | " | " | 0.61 | 1.25 |
| AES 1215-6 | " | " | 1.12 | 0.33 |
| AES 810-2.6A | " | " | 1.29 | 0.34 |
| AESo 1215-6 | " | " | 0.92 | 0.62 |
| AESo 1215-12 | " | " | 0.93 | 0.45 |
| AEGS 1215-7 | " | " | 0.33 | 7.0 |
| AEGS 1215-12 | " | " | 2.50 | 2.38 |
| AEC 1213-4.5 | 75 | D/T[c] | 0 | 0 |
| AEC 1213-6 | " | " | 0 | 0 |
| AEC 1215-9 | " | " | 0 | 0 |
| AEC 1214-10 | " | " | 0 | 0 |
| AEC 1214-13 | " | " | 0 | 0 |
| APEC 15-5 | " | " | 0 | 0 |
| APEC 15-7 | " | " | 0 | 0 |
| AES 1213-6.5A | " | " | 0.09 | 0 |
| AES 1213-12A | " | " | 0.61 | 0.02 |
| AES 1215-6 | " | " | 0.33 | 0 |
| AES 810-2.6A | " | " | 0.32 | 0.23 |
| AESo 1215-6 | " | " | 0.21 | 0 |
| AESo 1215-12 | " | " | 0.20 | 0 |
| AEGS 1215-7 | " | " | 0.07 | 0 |
| AEGS 1215-12 | " | " | 1.25 | 0.33 |

[a]Ratio of foam volume after 60 minutes in the one atmosphere foam test in the presence of hydrocarbon to foam volume after 60 minutes in the one atmosphere foam test in the absence of hydrocarbon.
[b]Decane.
[c]3 parts by weight decane and one part by weight toluene.

EXAMPLE 1

The purpose of this example is to demonstrate the foaming properties of AEC surfactants in the presence of various crude oils. Compositions of the crude oils used in this example of the invention are summarized in Table 3.

TABLE 3

| | Crude Oil Properties | | | | | | |
|---|---|---|---|---|---|---|---|
| | I | II | III | IV | V | VI | VII |
| API gravity | 28.5 | 35.9 | 33.1 | 31.0 | | 26.2 | 31.1 |
| Median carbon number | 20.0 | 16.6 | 19.1 | 16 | 26 | 19.7 | 21.0 |

TABLE 3-continued

| | Crude Oil Properties | | | | | | |
|---|---|---|---|---|---|---|---|
| | I | II | III | IV | V | VI | VII |
| % asphaltenes | 0.7 | 0.09 | 1.83 | 0.78 | 1.52 | 10.88 | 0.76 |
| % sulfur | 0.20 | 0.21 | 0.80 | 1.95 | 2.67 | 0.47 | 0.20 |
| Acid number | 0.81 | 0.28 | 0.12 | 0.21 | 0.34 | 0.25 | 0.04 |
| Base number | 0.05 | 0.06 | 0.06 | 0.33 | 0.85 | 0.30 | 0.07 |
| Density (60° F.) | 0.8845 | 0.8451 | 0.8599 | | | 0.8975 | 0.8702 |

I = Gulf Coast 1.
II = Gulf Coast 1 (73% volume) and isooctane (27% volume). (Isooctane added to replace volatile low molecular weight components of the oil. This blend exhibits the same phase behavior as the crude oil in the reservoir.)
III = Gulf Coast 2.
IV = West Texas.
V = $CO_2$ extracted West Texas.
VI = Rocky Mountain 1.
VII = Rocky Mountain 2.
Acid number is calculated as the number of milligrams of KOH which reacts with 100 g of oil to neutralize organic acids present in the oil.
Base number is calculated as the number of milligrams of HCl which react with 100 g of oil to neutralize organic bases present in the oil.

One atmosphere foam tests were run on several AEC surfactants within the scope of this invention, and, for comparative purposes, on other surfactants. In each case, a test was made in the presence of each of the several oils. Brine 1 (Table 1) was used in all tests. Results are shown in Table 4.

TABLE 4

| | | 1.0 Minute Foam Volumes Crude Oil | | | | | |
|---|---|---|---|---|---|---|---|
| Surfactant | Temperature (°C.) | None | II | III | IV | VI | VII |
| AEC 1213-6 | 25 | 16.6 | 3.3 | 7.4 | 5.0 | 8.2 | 0.8 |
| AEC 1215-9 | " | >15.9 | 7.4 | 9.6 | 6.9 | 6.1 | 0.6 |
| AEC 1214-10 | " | >17.0 | 4.1 | 7.6 | 5.8 | 4.2 | 0.7 |
| AEC 1214-13 | " | 15.2 | 6.0 | 11.1 | 9.1 | 6.3 | 1.0 |
| AEC 1215-9 | 75 | >15.2 | 7.8 | 8.8 | 7.6 | 7.8 | 5.4 |
| AEC 1214-10 | " | >16.2 | 4.4 | 11.1 | 5.8 | 8.2 | 7.8 |
| AEC 1214-13 | " | >15.1 | 5.6 | 13.1 | 6.7 | 9.9 | 9.7 |

Results of one atmosphere foam tests in the presence of the oils indicated excellent performance of the AEC surfactants at elevated temperature. For reasons not now understood, the trends indicated by these results were opposite those which were predicted from foam tests carried out in the presence of refined hydrocarbons (described in Comparative Experiment A above). The comparative tests made with refined hydrocarbons predicted relatively poor foam stability for AEC surfactants at the higher temperature.

Comparative Experiment B

This comparative experiment illustrates the importance of the use in the invention of an AEC surfactant having an average number of ethylene oxide units in the surfactant molecule which is at least about 5. A series of one atmosphere foam tests were run of AEC 1213-4.5 surfactant, in the presence of the crude oils described in Table 3. Brine 1 (Table 1) was used in all tests.

TABLE 5

| | | 1.0 Minute Foam Volumes Crude Oil | | | | | |
|---|---|---|---|---|---|---|---|
| Surfactant | Temperature (°C.) | None | II | III | IV | VI | VII |
| AEC 1213-4.5 | 75 | 2.4 | 0.2 | 0 | 1.0 | 0.2 | 0.8 |
| AEC 1215-9 | " | >15.2 | 7.8 | 8.8 | 7.6 | 7.8 | 5.4 |

Table 5 presents the results of the series of tests of the AEC 1213-4.5 surfactant, having an average of only 4.5 ethylene oxide units per molecule and thus unsuitable for use in the invention. For comparison, Table 5 also presents the results obtained in Example 1 for AEC 1215-9, having an average of 9 ethylene oxide units per molecule.

EXAMPLE 2

This example illustrates the foaming behavior of AEC surfactants under conditions representative of the Wasson Field (West Texas). Comparison is also provided of the relative properties of the AEC surfactants with APEC surfactants, under the same conditions. Average reservoir temperature in the Wasson Field is about 40° C.

One atmosphere foam tests were carried out for AEC and APEC surfactants using as the aqueous medium the West Texas brine described as Brine No. 4 in Table 1. Results of these tests are shown in Table 6, in terms of foam volume both after 1 minute and after 30 minutes, and also in terms of the ratio of the 30 minute volume to the 1 minute volume. These results show that high volumes of foam were generated in the AEC tests. Moreover, the high ratios of the 30 minute volumes to the 1 minute volumes indicates that the AEC foams were highly stable. In contrast, the APEC tests generated little foam, and the APEC foams were substantially less stable.

TABLE 6

| | | Foam Volume | |
|---|---|---|---|
| Surfactant | Temperature (°C.) | 30 minutes | Ratio, 30 min.:1 min. |
| AEC 1213-6 | 40 | 9.9 | 0.70 |
| AEC 1214-10 | " | 11.3 | 0.68 |
| AEC 1214-13 | " | 10.0 | 0.63 |
| AEC 1215-9 | " | 5.9 | 0.45 |
| APEC 15-5 | " | 0 | 0 |
| APEC 15-7 | " | 2.4 | 0.24 |

I claim as my invention:

1. A process for enhancing the recovery of oil from a subterranean oil-containing reservoir having a temperature of at least about 40° C., which comprises steps for
(a) injecting into an injection well in the reservoir substantially liquid $CO_2$ and an aqueous mixture containing between about 50 and 10,000 parts per million by weight, calculated on the weight of the water, of one or more surfactants of the formula

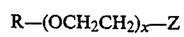

$$R—(OCH_2CH_2)_x—Z$$

wherein R represents an alkyl group of about 8 to 16 carbon atoms, x is an integer having an average value of about 5 to 20, and Z represents either a —OCOOM formate group or a —$OCH_2COOM$ acetate group, with M representing a mono-valent inorganic cation, to displace oil from the reservoir, and (b) recovering the displaced oil from one or more recovery wells in the reservoir.

2. The process of claim 1, wherein Z in the formula for the surfactants represents a —$OCH_2COOM$ acetate group.

3. The process of claim 2, wherein R in the formula for the surfactants represents an alkyl group of about 9 to 15 carbon atoms.

4. The process of claim 3, wherein x in the formula for the surfactants has an average value in the range from about 6 to 15.

5. The process of claim 4, wherein the aqueous mixture contains between about 50 and 1000 parts per million of the one or more surfactants, calculated on the weight of the water.

6. The process of claim 5, wherein the temperature of the reservoir is in the range from about 50° C. to 95° C.

7. The process of claim 6, wherein the temperature of the reservoir is in the range from about 70° C. to 80° C.

8. The process of claim 5, wherein R in the formula for the surfactants represents an alkyl group of about 11 to 15 carbon atoms.

9. The process of claim 5, wherein the alkyl group R is a linear alkyl group in a major portion of the molecules.

10. The process of claim 8, wherein the alkyl group R is a linear alkyl group in a major portion of the molecules.

11. The process of claim 5, wherein x in the formula for the surfactants has an average value in the range from about 6 to 15.

12. The process of claim 11, wherein x in the formula for the surfactants has an average value in the range from about 9 to 13.

13. The process of claim 5, wherein the aqueous mixture contains between about 100 and 1000 parts per million of the one or more surfactants, calculated on the weight of the water.

14. The process of claim 13, wherein the aqueous mixture contains between about 300 and 700 parts per million of the one or more surfactants, calculated on the weight of the water.

15. The process of claim 5, wherein the quantity of water injected is between about 0.1 and 1 part by volume relative to the volume of liquid phase $CO_2$.

16. The process of claim 15, wherein the quantity of water injected is between about 0.1 and 1 times the pore volume of the reservoir.

17. The process of claim 5, wherein the $CO_2$ is injected at a pressure of at least about 1200 psig.

18. The process of claim 17, wherein the $CO_2$ is injected at a pressure above the miscibility pressure of the oil in the reservoir.

19. A process for enhancing the recovery of oil from a subterranean oil-containing reservoir having a temperature in the range from about 50° C. to 95° C., which comprises steps for (a) injecting into an injection well in the reservoir at a pressure of at least about 1200 psig:

(i) substantially liquid $CO_2$ and (ii) an aqueous mixture containing between about 100 and 1000 parts per million, calculated on the weight of water, of one or more surfactants of the formula

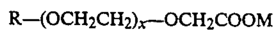

$$R{-}(OCH_2CH_2)_x{-}OCH_2COOM$$

wherein R represents represents an alkyl group of about 9 to15 carbon atoms and is a linear alkyl group in a major portion of the surfactant molecules and x has an average value in the range from about 6 to 15, the quantity of water in said aqueous mixture being between about 0.1 and 1 part by volume relative to the volume of liquid phase $CO_2$, to displace oil from the reservoir, and (b) recovering the displaced oil from one or more recovery wells in the reservoir.

* * * * *